July 17, 1951

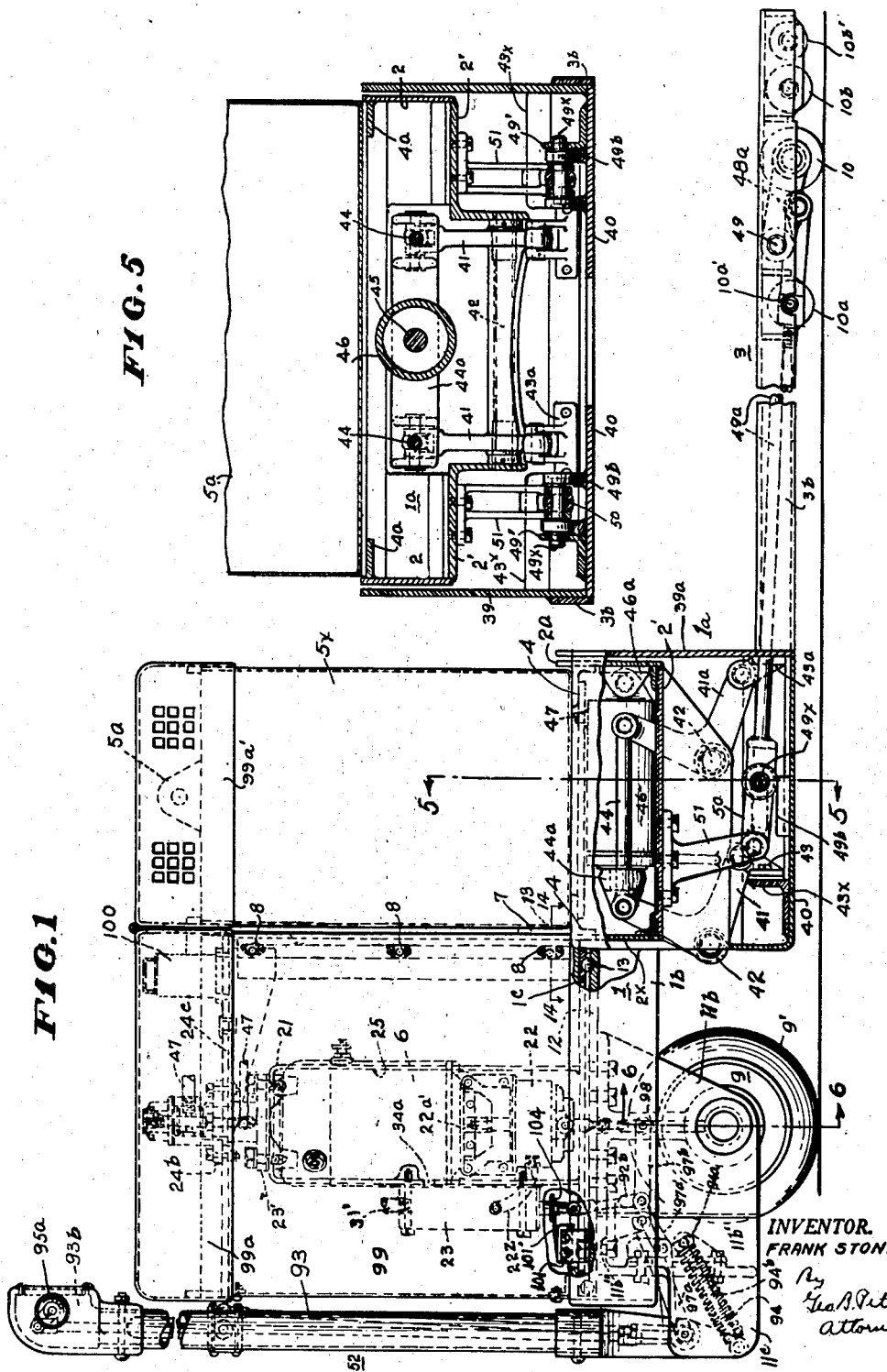

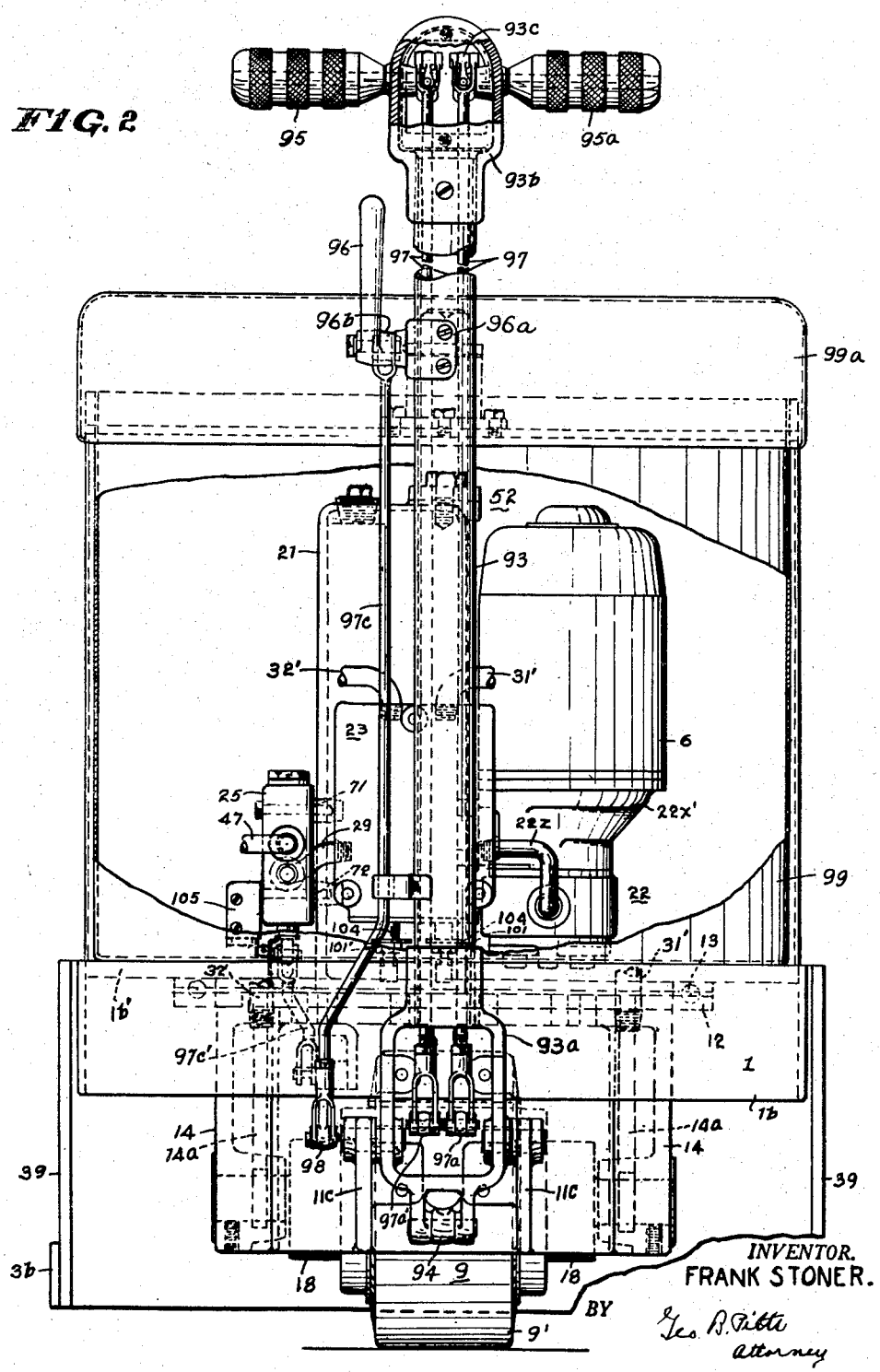

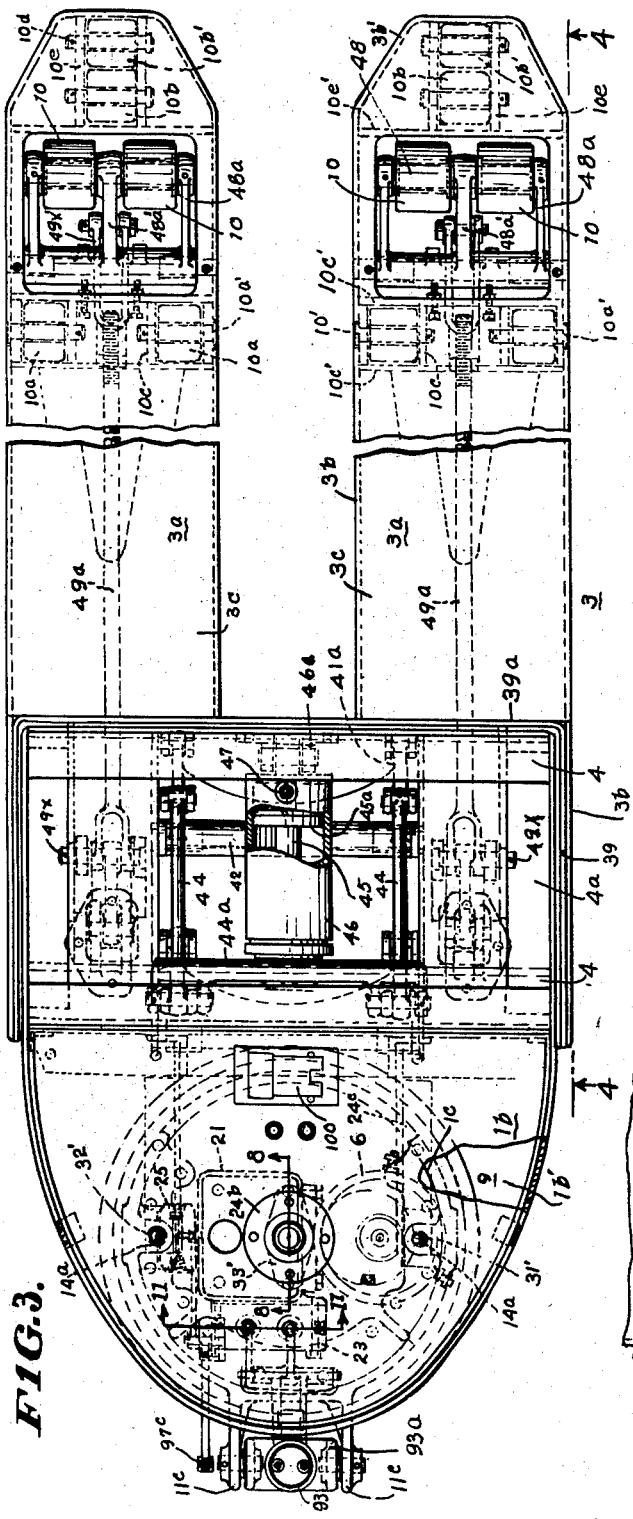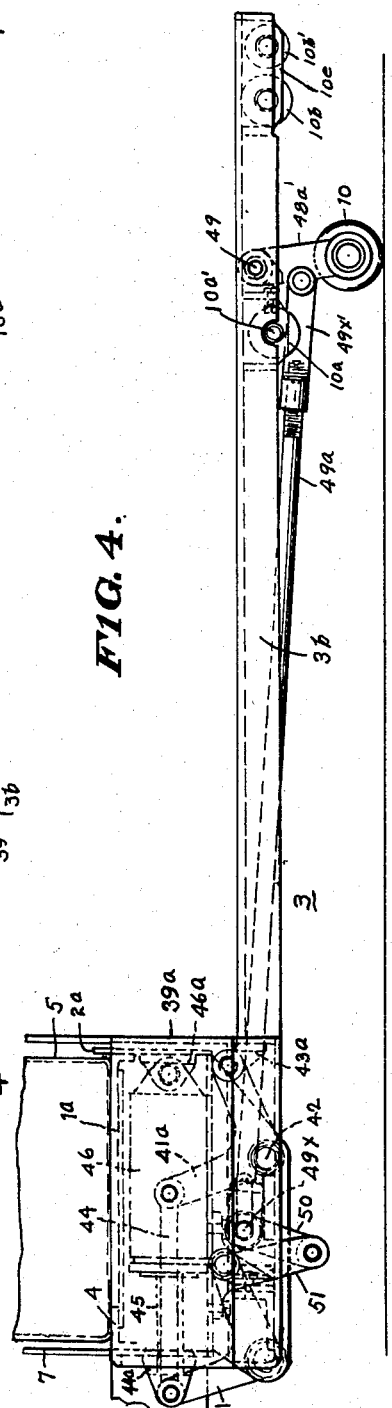

F. STONER 2,560,608

ARRANGEMENT OF LOAD CARRIER AND LIFTING MECHANISM FOR TRUCKS

Filed July 12, 1945

INVENTOR.
FRANK STONER.
BY Geo. B. Pitts
attorney

July 17, 1951  F. STONER  2,560,608
ARRANGEMENT OF LOAD CARRIER AND LIFTING
MECHANISM FOR TRUCKS
Filed July 12, 1945  9 Sheets-Sheet 5
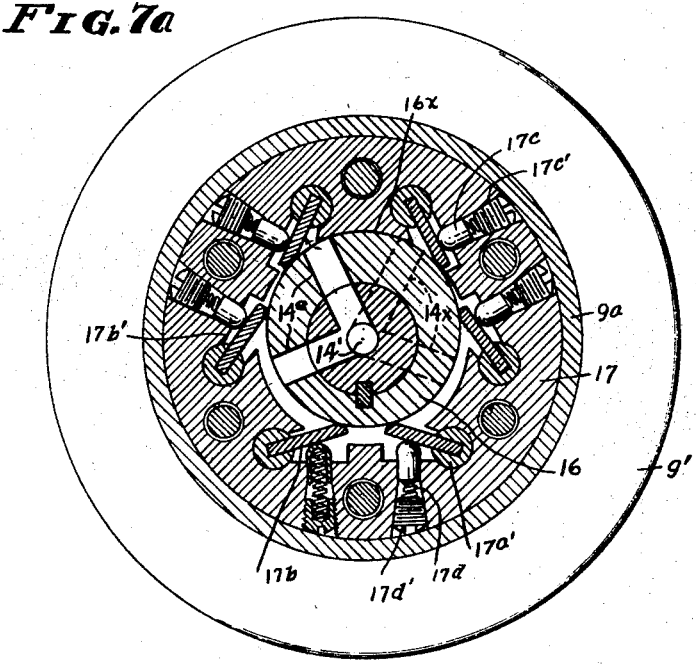
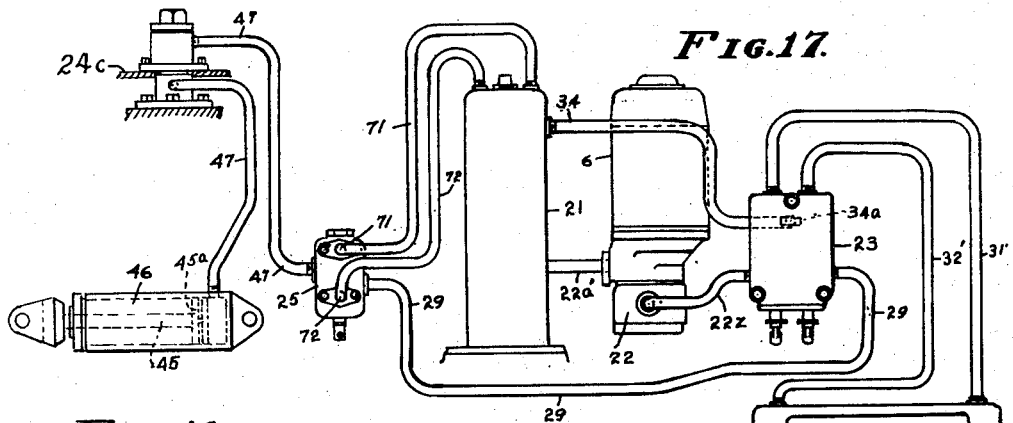
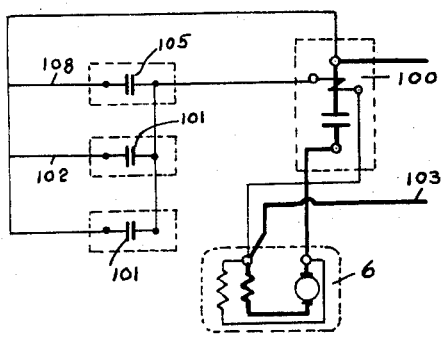
INVENTOR.
FRANK STONER.
BY

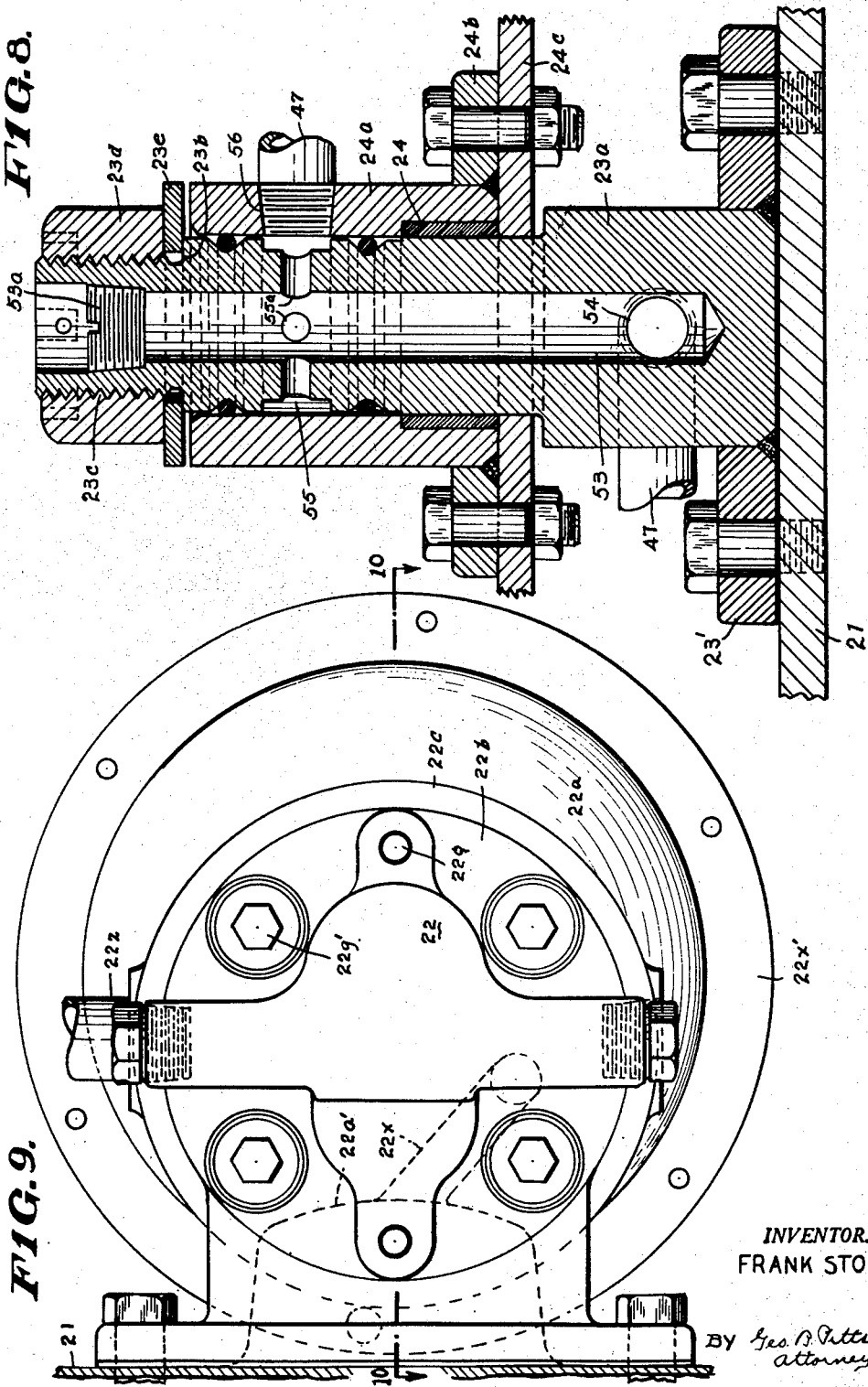

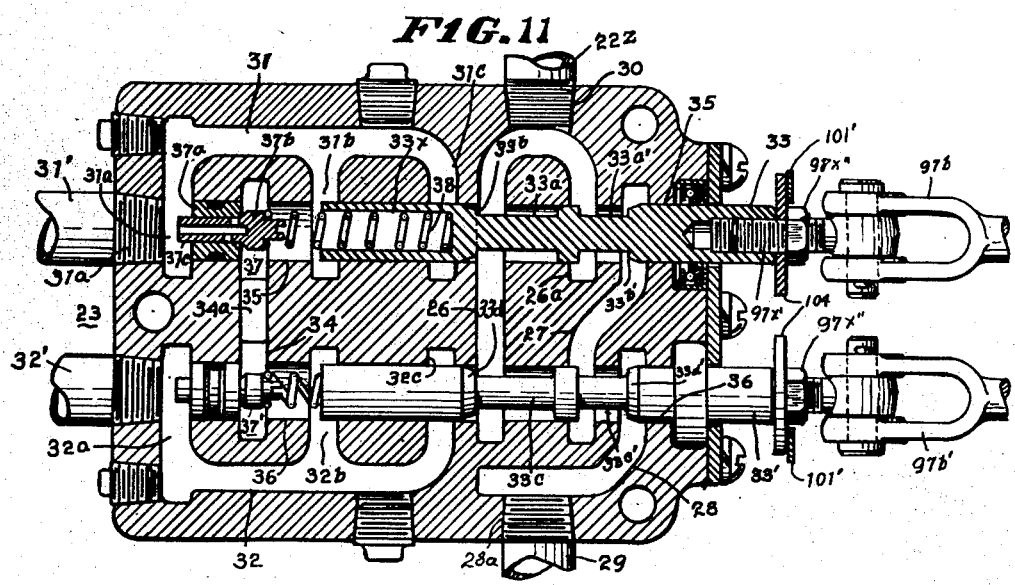
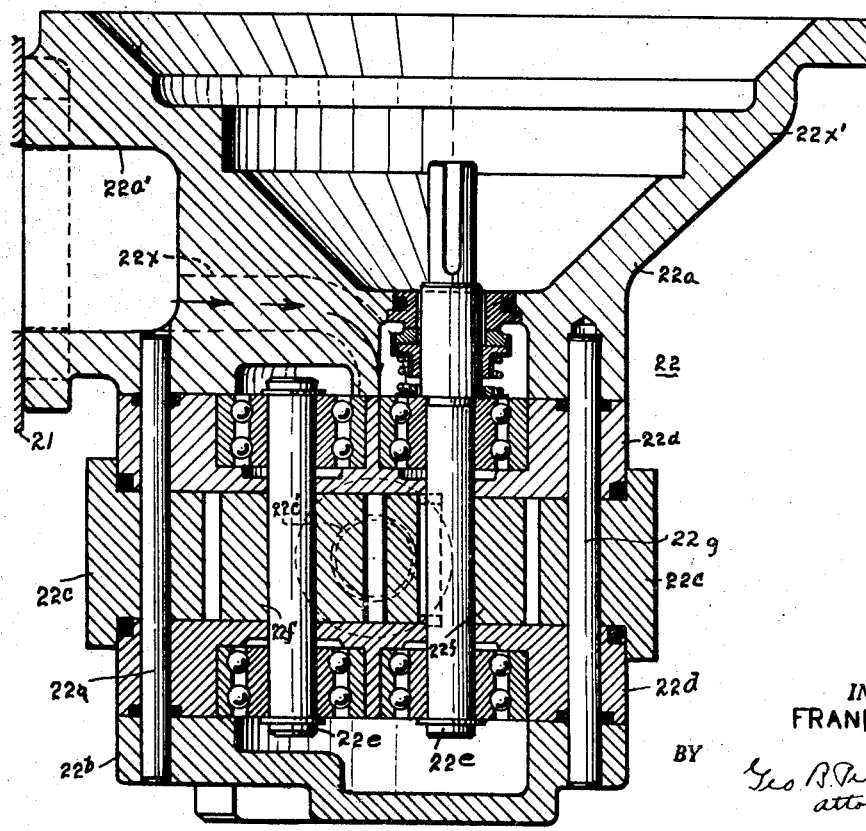

July 17, 1951 F. STONER 2,560,608
ARRANGEMENT OF LOAD CARRIER AND LIFTING
MECHANISM FOR TRUCKS
Filed July 12, 1945 9 Sheets-Sheet 8
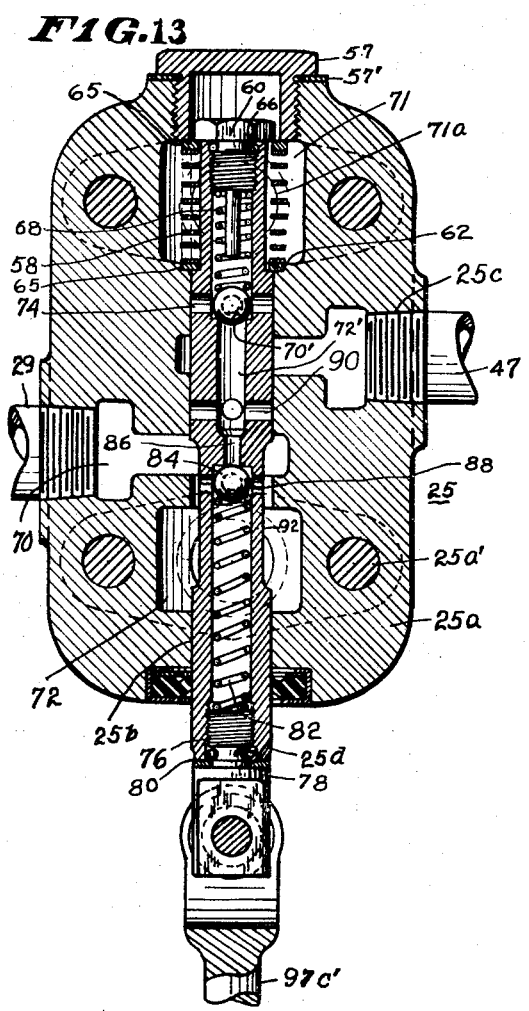
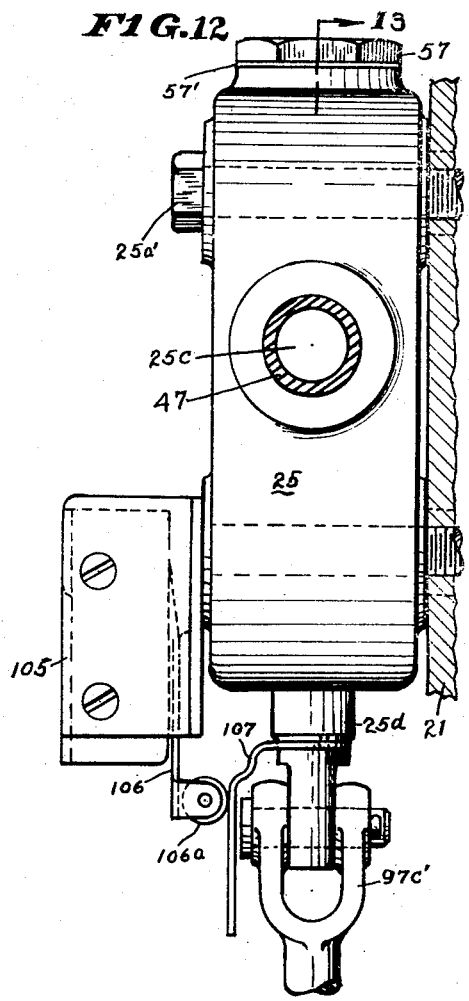
INVENTOR.
FRANK STONER.
BY Geo. B. Titter
attorney

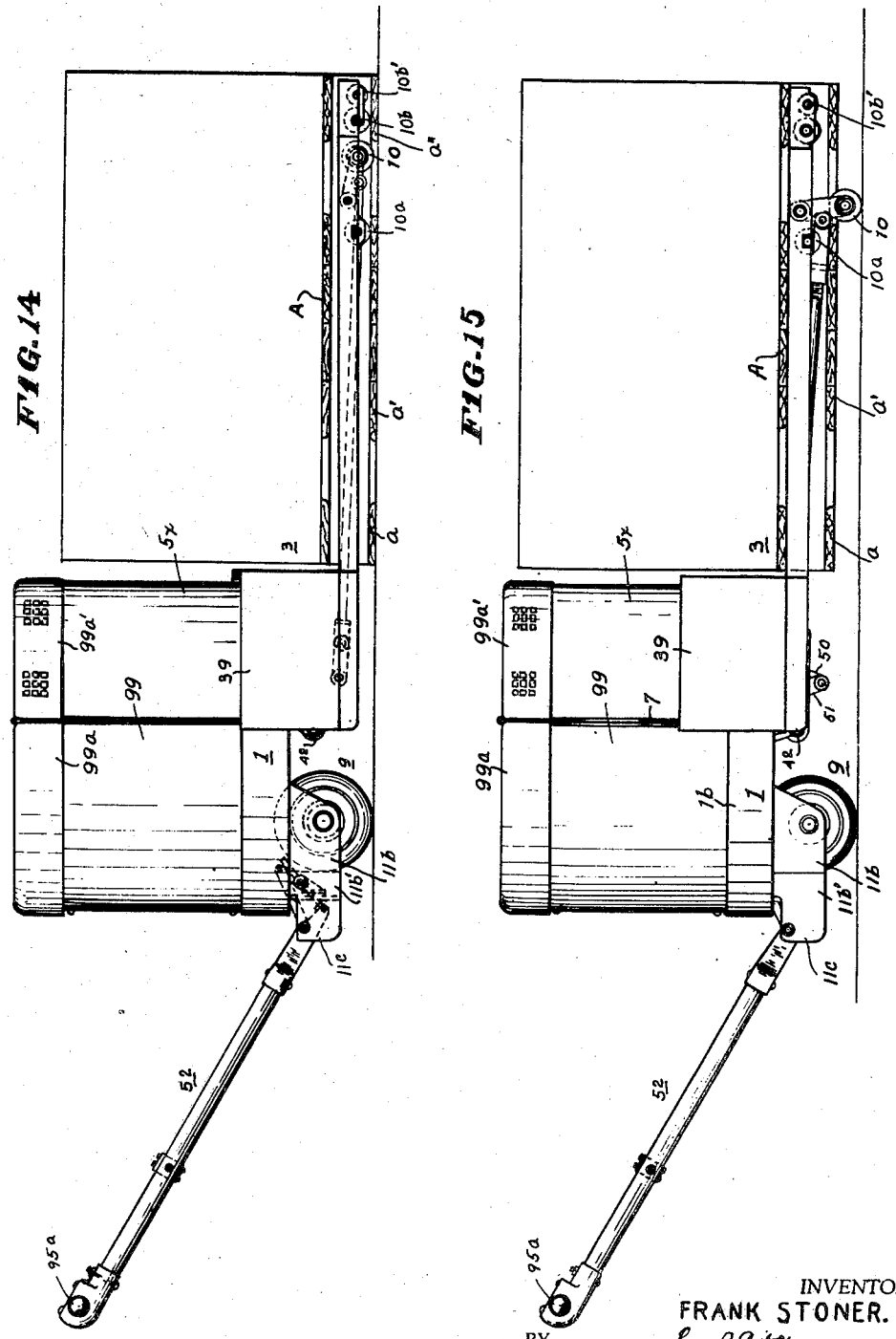

Patented July 17, 1951

2,560,608

UNITED STATES PATENT OFFICE 2,560,608

ARRANGEMENT OF LOAD CARRIER AND LIFTING MECHANISM FOR TRUCKS

Frank Stoner, Lakewood, Ohio, assignor to The Baker-Raulang Company, Cleveland, Ohio, a corporation of Ohio Application July 12, 1945, Serial No. 604,565

3 Claims. (Cl. 254—2)

1

This invention relates to a truck provided with a guiding element and having a power propelled steerable traction mechanism, manually controlled by means on the guiding element, whereby an operative walking at one end of the truck may transport loads from place to place in a ready manner. As later set forth, the truck includes a material handling mechanism. The operative is therefore relieved from the labor of pulling or pushing the truck, as well as the undue physical exertion when traversing inclines, whether the truck is loaded or unloaded.

One object of the invention is to provide an improved truck of this type wherein the control for driving, retarding and/or braking the truck is materially simplified, whereby less energy and bodily movement in moving the guiding element is required and a ready and positive control of the truck movement at maximum or reduced speed or stoppage of such movement results.

Another object of the invention is to provide an improved truck of this type having an material handling mechanism for loads and hydraulically operated power means for driving the truck and operating the mechanism.

Another object of the invention is to provide an improved material handling and carrying truck of this type having hydraulic means for driving its traction mechanism and hydraulic means for operating the handling and carrying mechanism and a single source of fluid supply under pressure, whereby these means and the fluid supply therefor are simplified in construction and assembly.

Another object of the invention is to provide an improved truck consisting of a tractor unit and a load carrying and lifting unit, the latter having a platform extending rearwardly of the tractor unit and at a low level and supported at its outer end by swingably mounted rollers which are operated by a power mechanism carried by the tractor unit.

A further object of the invention is to provide an improved truck having a material handling mechanism which is capable of engaging skids or double faced pallets in carrying out load transporting operations.

Other objects of the invention will be apparent to those skilled in the art to which my invention relates from the following description taken in connection with the accompanying drawings, wherein:

Fig. 1 is a side elevation of a truck embodying my invention, parts being broken away.

Fig. 2 is a front elevation.

Fig. 3 is a plan view.

2

Fig. 4 is a fragmentary view, on the line 4—4 of Fig. 3, showing the lift mechanism in elevated position.

Fig. 5 is a section on the line 5—5 of Fig. 1.

Figure 6:
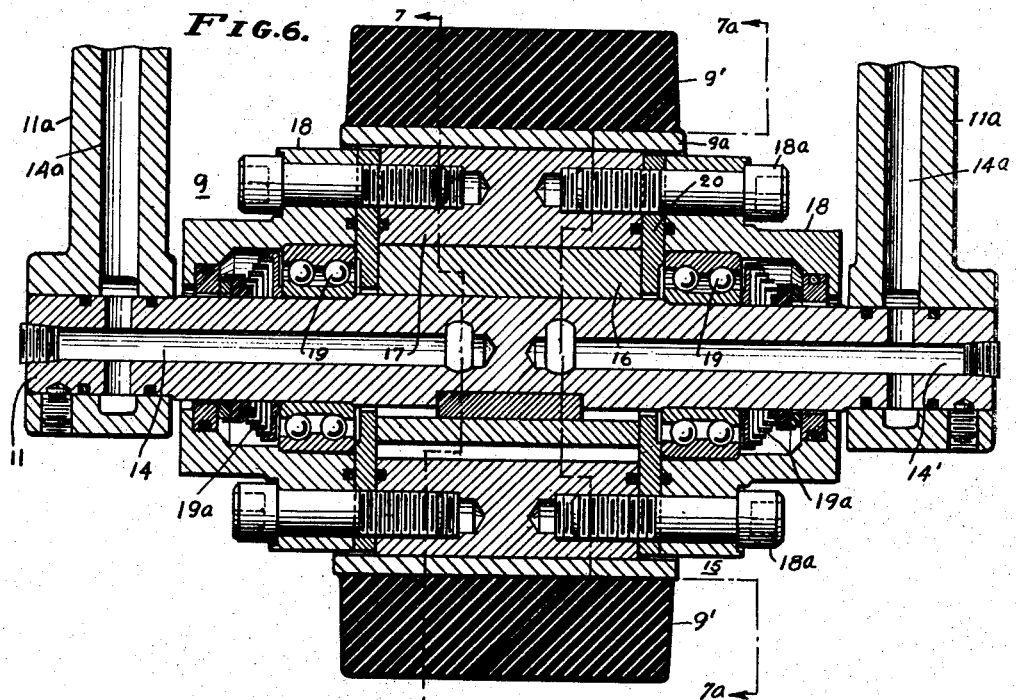
Figure 7:
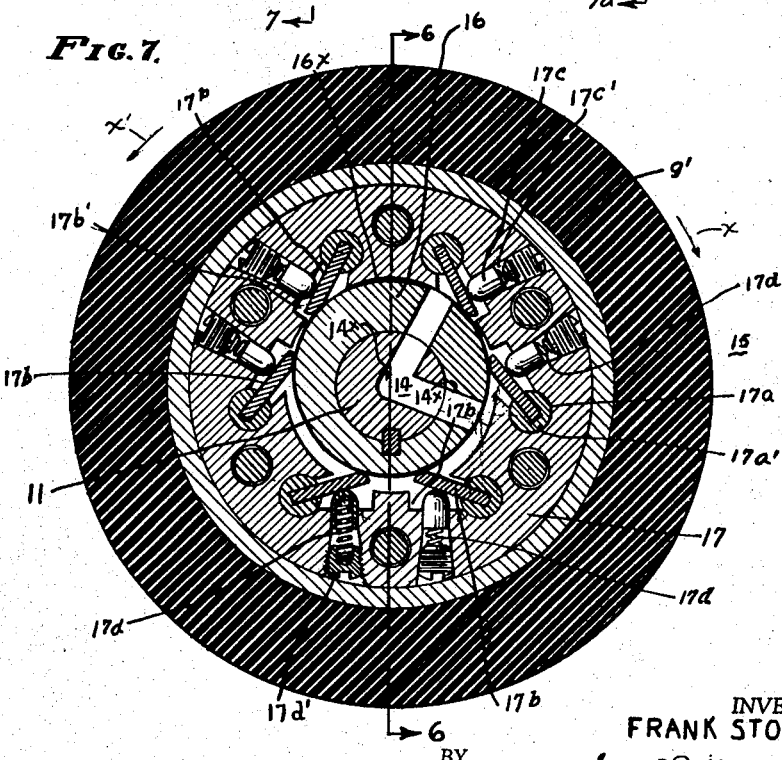

Fig. 6 is a fragmentary section on the line 6—6 of Figs. 1 and 7.

Fig. 7 is a section on the line 7—7 of Fig. 6.

Fig. 7a is a section on the line 7a—7a of Fig. 6.

Fig. 8 is a fragmentary section on the line 8—8 of Fig. 3, enlarged.

Fig. 9 is a bottom plan view of the pump.

Fig. 10 is a section on the line 10—10 of Fig. 9.

Fig. 11 is a section through the travel valve, on the line 11—11 of Fig. 3, enlarged.

Fig. 12 is an elevational view of the valve for the lift mechanism, looking toward the left of Fig. 13.

Fig. 13 is a section on the line 13—13 of Fig. 12.

Figs. 14 and 15 are side views of the truck showing the operation of engaging a loaded double faced pallet and raising it preparatory to transporting the load to a place of discharge.

Fig. 16 is a diagram of the electric circuit.

Fig. 17 is a diagram of the fluid system.

In the drawings, 1 indicates as an entirety a frame preferably formed of steel plates or bars suitably welded or otherwise rigidly connected to provide a rear section 1a and a front section 1b, the latter preferably having curvilinear side walls supporting therewithin a plate 1b' formed with an enlarged opening 1c for a purpose later referred to. The rear frame section 1a consists of depending side bars 2 to which are rigidly connected spaced angles 2', a front bar 2x connecting the side bars and a rear bar 2a, the angles and rear bar serving to movably support a material handling mechanism indicated as an entirety at 3. The upper ends of the bars 2, 2x and 2a are provided with transversely arranged angles 4 on which a battery 5 is mounted, the battery serving to supply current to a motor 6, which is later referred to. The angles 4 are connected by tie members 4a, which are welded to the lower sides thereof and the side bars 2. The battery is preferably enclosed in a housing 5x supported on the rear frame section 1a on the rear side of an up-standing transverse plate 7 fixedly mounted on the frame 1; when the housing 5x is omitted, the battery may be slid on the angles 4 transversely of the frame section 1a into position on the section 1a or to remove it therefrom, but where the housing is employed the battery may be positioned on or removed from the section 1a by a crane engaging ears 5a on the battery 5.

The truck frame 1 is mounted for translation from place to place on a combined traction and steerable mechanism, (indicated as an entirety at 9), rotatably carried by the front frame section 1b, which mechanism in the present disclosure includes a wheel 9', and one or more supporting wheels 10, which form part of the material handling mechanism 3. In the present disclosure, for reasons later apparent, I provide two pairs of wheels 10 (each wheel of each pair being relatively wide), which are mounted on swingable yokes or devices (later referred to) to raise and lower the outer end portion of the load handling mechanism 3. In the form of construction shown the material handling mechanism 3 is movably connected to the frame 1, and the wheel 9' and wheels 10 co-operate to support the frame 1, when the truck is at rest or is being driven, irrespective of whether the mechanism 3 is raised or lowered and loaded or unloaded.

As shown in Fig. 6, the driving means for the wheel 9' is of the hydraulic rotary type and is incorporated therein and the power supply for the driving means and its valve mechanism are unitarily connected with the mounting for the traction and steerable mechanism to simplify the assembly and insure a direct connection between the power supply and the driving means.

The combined traction and steerable mechanism comprises the following: 11 indicates an axle fixedly supported at its opposite ends in arms 11a which are fixed to and depend from a disk 12. The marginal portion of the disk 12 engages a ring bearing 13 of the anti-friction type, provided between the disk and marginal portion of the opening 1c, whereby the mechanism is bodily rotatable about the axis of the bearing 13 for steering the truck when the latter is being power driven or manually moved. The axle 11 is formed with ducts 14, 14', extending inwardly from its opposite ends, each duct being connected with a supply duct 14a formed in and extending through the adjacent arm 11a; in this arrangement the duct 14 and the adjacent duct 14a supply fluid—such as oil—(which supply is under pressure) to the driving means or motor, indicated as an entirety at 15, to drive the wheel 9' in one direction and the duct 14' and the adjacent 14a supply fluid to the driving means or motor 15 to drive the wheel in the opposite direction. The hydraulic rotary motor consists of a stator 16 fixed to the axle 11 and having an outer wall eccentric to the axis of the axle 11, as shown at 16x and a rotor 17 suitably fixed to the rim 9a for the wheel 9', the rim 9a being preferably provided with a tire of the solid rubber type. The rotor 17 and wheel 9' are mounted to rotate on the axle 11 in the following manner; 18 indicates cup shaped hub members rigidly secured to the opposite ends of the rotor 17 by cap screws 18a. The hub members 18 are interiorly shaped to accommodate suitable anti-friction bearings 19, the inner end of the inner race of each bearing being seated against an annular shoulder provided on the axle 11, and its outer end being biased inwardly by a coiled spring 19a interposed between it and the end wall of the adjacent hub member 18. Annular disks 20, which are interposed between the rotor 17 and hub members 18 and fixed thereto by the screws 18a, extend inwardly beyond the rotor 17 to engage the inner ends of the outer races for the bearings 19 and maintain them in their seats provided on the inner walls of the hub members 18. The stator 16 is mounted between the disks 20, which prevent endwise movement thereof longitudinally of the axle.

The inner wall of the rotor 17 is formed with a plurality of cylindrical sockets 17a disposed parallel to and equal distances from the axis of the axle 11 and each oscillatably supporting therein a pin 17a' to which is rigidly secured a follower 17b. Each follower extends into the chamber between the rotor 17 and stator 16 and rides the surface of the latter as the rotor 17 rotates. The inner wall of the rotor 17 is recessed opposite the outer end of each follower, as shown at 17b', to accommodate the swinging movement of the follower as it rides the eccentric portion of the stator 16. Each follower 17b is biased inwardly about the axis of the adjacent pin 17a' by a plunger 17c slidably mounted in an opening 17c' formed in the rotor 17. Each plunger 17c is preferably hollow to form a seat for the inner end of a spring 17d, its outer end abutting a plug 17d' threaded into the outer end portion of the adjacent opening 17c'. As will be observed from Figs. 7 and 7a, I provide two sets of followers 17b, the followers of each set being uniformly spaced about the axle 11 and each follower of one set being disposed between two followers of the other set; also, that the followers 17b of one set extend in a clockwise direction and those of the other set extend in a counter-clockwise direction (as viewed in Figs. 7 and 7a). Accordingly, fluid supplied through ducts 14a, 14 and a port 14x formed in and leading through the axle 11 and stator 16 and having its outlet at one side of the eccentric 16x will apply high pressure to the followers 17b which extend counter-clockwise to rotate the rotor 17 in the direction indicated by the arrow x' in Fig. 7, the supplied fluid being discharged on the low pressure side through a port 14e at the opposite side of the eccentric and formed in and leading through the stator 16 and axle 11 and connected to the duct 14' (see Fig. 7a); likewise, fluid supplied through ducts 14a, 14' and port 14e will apply high pressure to the followers 17b which extend clockwise to rotate the rotor 17 in the direction indicated by the arrow x' in Fig. 7, the supplied fluid being discharged on the low pressure side through the port 14x and ducts 14, 14a. From the foregoing description it will be noted that by controlling the flow of the fluid, the motor 15 may be driven in either direction. It will be understood that upon the admission of the fluid through one port to the rotor 17, pressure is initially applied to one active follower 17b and then progressively to the correspondingly positioned followers as the rotor rotates and that this pressure continues until the supplied fluid is discharged through the other part, whereas the oppositely disposed followers 17b will yield in the direction of fluid flow in opposition to the springs 17d to permit the fluid pressure to be maintained on the active followers until it is discharged through the latter port. By preference I provide at opposite sides of the eccentric 16x two ports 14x, 14e, respectively, so that the pressure may be applied to two active followers substantially simultaneously.

The fluid supply for the motor 15 consists of a tank 21 for holding a supply of fluid, fixed to the disk 12, a rotary pump indicated as an entirety at 22, driven by the motor 6, for circulating the fluid, a valve mechanism indicated as an entirety at 23 for controlling the fluid supply to the ducts 14a and operating means (later referred to) for the valve mechanism 23. The top wall of the tank 21 has secured to it a plate 23' (see Fig. 8), which is provided with an upstanding shaft 23a in coaxial relation with the axis of the ring bearing 13 and rotatably mounted in a bearing 24 carried by a collar 24a. The collar 24a is suitably fixed to a base plate 24b which is rigidly secured to a bracket 24c carried by the upper end portion of the wall 7. The upper end portion of the shaft 23a is provided with an annular shoulder 23b and outwardly thereof the shaft 23a is provided with screw threads 23c to take a nut 23d, which is tightened through a washer 23e against the shoulder 23b and co-operates with the ring bearing 13 to rotatably support the wheel 9' and motor 15 and parts carried by the disk 12 in the frame section 1b and maintain them against vertical movement relative to the latter. The casing for the pump 22 is bolted directly to the side wall of the tank and preferably consists of an upper section 22a, a lower section 22b, an annular side section 22c and bearing supporting members 22d spaced by the side section 22c and interposed therebetween the latter and the upper and lower casing sections. The casing sections are assembled in alined relation by dowel pins 22g and secured together by bolts 22g'. The members 22d support bearings (preferably of the anti-friction type) for the shafts 22e for suitable impellers 22f, one of said shafts being extended upwardly and directly coupled to the shaft of the motor 6. The upper casing section 22a is formed with a recess 22a' in registry with an opening in the side wall of the tank 21 and connected to a duct 22x leading into one side of the pump chamber, whereas the side section 22c is formed with an outlet 22c', remote from the outlet end of the duct 22x, connected to a pipe 22z, which leads to the valve mechanism 23, as shown in Figs. 1 and 2. The upper pump section preferably terminates in an inverted bell-shaped wall 22x' which is secured to the lower end of the motor 6.

The valve mechanism 23 is provided with two separately operating valves, whereby the fluid may be supplied to the motor 15 to drive the wheel 9' in either direction, and is constructed to operate as follows: when the valve elements are in neutral or normal position, the fluid is by-passed through the valve casing and is returned to the tank 21, this return preferably being through a valve mechanism 25 for controlling the material handling mechanism 3 to operate the latter when the truck is at rest, whereby separate fluid connections between the pump 22, the valve mechanism 25 and tank 21 are eliminated, since no occasion would arise for driving the traction wheel 9' and simultaneously operating the mechanism 3 to raise it. The casing for the valve mechanism 23 is mounted on the front wall of the tank 21 and preferably formed in sections and provided therein with flow channels as follows: 26 indicates a transverse channel having at its upper end an extended channel 26a parallel to the upper portion of the channel 26. 27 indicates a supplemental transverse channel. 28 indicates an outlet channel leading to an outlet 28a, which is connected to a pipe 29. The pipe 29 is connected to the valve mechanism 25, from which the fluid is returned to the tank 21 or utilized to operate the load handling mechanism 3, as hereinafter set forth. 30 indicates the inlet to which the supply pipe 22z for the fluid is connected, for supplying fluid to the channels 26, 26a. 31, 32, indicate flow channels connected through outlets to pipes 31', 32', respectively, the pipe 31' being connected to the duct 14a which is connected with the duct 14', to drive the wheel 9' in the direction to effect forward travel of the truck when one valve element (indicated as an entirety at 33) is operated and the pipe 32' being connected to the duct 14a, which is connected to the duct 14 to drive the wheel 9' in the opposite or rearward direction when another valve element (indicated as an entirety at 33') is operated. As will be observed, when the fluid is supplied through the pipe 31' to the motor 15 for forward truck travel, the fluid in the ducts 14', 14a, is forced by the motor back through pipe 32' for return flow to the tank 21 and when the fluid is supplied through pipe 32' to the motor 15 for rearward truck travel, the fluid in the ducts 14, 14a, is forced by the motor back through pipe 31' for return flow to the tank 21, the valve mechanism 23 being constructed, as will later be set forth, to provide for this return fluid flow to thus eliminate separate flow connections from the motor 15 to the tank 21. The channel 31 is provided with branch channels 31a, 31b, 31c, whereas the channel 32 is provided with branch channels 32a, 32b, 32c. 34 indicates a return flow channel for the fluid having an outlet 34a which registers with an opening formed in the adjacent wall of the tank 21. 35 indicates a longitudinally extending opening in line with and connected with the channels 27, 26a, 26, 31c, 31b, 34 and 31a, the wall of the opening 35, between certain of said branch channels, forming a guide for the valve element 33 and flow ports for the fluid between said channels, dependent upon the position of the valve element 33. 36 indicates a longitudinally extending opening in line with and connected with the channels 28, 27, 26, 32c, 32b, 34, 32a, the wall of the opening 36, between certain of said branch channels, forming a guide for the valve element 33' and flow ports between said channels, dependent upon the position of the valve element 33'. The outer end of the valve element 33 when in neutral position (see Fig. 11) terminates in the channel 31b, so as to permit fluid flow from the pipe 31' through the channels 31a, 31, 31b, and opening 35 to the channel 34, but when the valve element 33 is operated (as later set forth toward the left as viewed in Fig. 11), the opening 35 between the channels 31b, 34, is closed. As shown, portions of the valve element 33 are reduced to form annular recesses 33a, 33a' the opposite outer ends walls of which provide cut-offs 33b, 33b'. Also, as shown, portions of the valve element 33' are reduced to form annular recesses 33c, 33c', the opposite outer end walls of which provide cut-offs 33d, 33d', and the outer end of the valve element 33', when in neutral position, terminates in the channel 32b so as to permit fluid flow from the pipe 32' through the channels 32a, 32, 32b and opening 36 to the channel 34, but when the valve element 33' is operated (as later set forth toward the left as viewed in Fig. 11) the opening 36 between channels 32b, 34, is closed.

When both valve elements 33, 33', are in neutral position (as shown in Fig. 11) and motor 6 is operating to drive the pump 22 the fluid from the supply pipe 22z flows through channel 26a, recess 33a', channel 27, recess 33c', channel 28 and pipe 29 and returns to the tank 21, as already set forth. If valve element 33 is operated, cut-off 33b' closes the channel 26a, cut-off 33b opens the connection between the channels 26, 31c, and the outer end of the valve element closes the connections between the channel 31b and channel 34, so that the fluid from supply pipe 22z flows through channel 26, recess 33a, channel 31c, channel 31 and channel 31a, to the pipe 31' to one side of the motor 15 and from the other side of the motor through pipe 32', channel 32a, channel 32, channel 32b, opening 36, channel 34 and opening 34a to the tank 21; and if the valve element 33' is operated, the cut-off 33d' closes the channel 27, cut-off 33d opens the connections between the channel 26 and channel 32c and the outer end of the valve element closes the connections between the channel 32b and channel 34, so that the fluid from the supply pipe 22z flows through the channel 26, recess 33c, channel 32c, channel 32, channel 32a and pipe 32' to the opposite side of the motor 15 and from the first mentioned side thereof through pipe 31', channel 41a, channel 31, channel 31b, opening 35, channel 34 and opening 34a to the tank 21. If both valve elements 33, 33', are simultaneously operated the fluid will be supplied to both sides of the motor 15 through the respective channels as above set forth, the effect of which is to stop it and hence stop the wheel 9'; accordingly, when the truck is in motion, due to operation of one of the valve elements, the other valve element may be operated and thus provide fluid pressure from the supply pipe 22z in opposition to the return flow of fluid from the motor 15, the effect of which is to retard the operation of the motor and to slow down the rotation of the wheel 9' and bring the motor to a stop, if desired. It will thus be observed that when the truck is being driven in either direction, the valve elements 33, 33', may be operated to increase or decrease the speed of the truck as well as provide a braking effect whether the truck is traversing a level or inclined surface. In this arrangement mechanical braking elements for the wheel or motor and a separate control therefor are eliminated. Due to the fact that the fluid system and motor rotor 17 are completely filled with fluid at all times, operation of either valve element 33, 33', insures quick starting, and operation of both elements insures ready braking and stoppage of the motor 15.

37, 37', indicate as entireties relief valve means mounted in the outer ends of the openings 35, 36, respectively, to relieve excessive pressure which may exist in the fluid system at any time. As these valve means are similar in construction, one (valve means 37) only will be referred to. The valve means 37 consists of a sealing member 37a seated in the opening 35 and formed with a through opening, the inner end of which serves as a seat for a valve element 37b. The valve element 37b is provided with a hollow shank 37c which slidably fits the opening through the element 37a. The outer end of the shank 37c is open to admit fluid thereinto from the channel 31a and its side wall is formed with a port (preferably two ports, in disalinement longitudinally) to connect the opening in the shank with the channel 34 when the valve element 37b is unseated. The valve element 37b is normally held in engagement with its seat by an expansion spring 38 interposed between it and the valve element 33, the outer end portion of which is formed with an inwardly extending recess 33x to accommodate the spring and permit a long spring to be employed. In this arrangement, each spring 38 is put under compression when the adjacent valve element 33 or 33' is operated to prevent operation of the relief valve when the fluid is being supplied to the motor 15 through the pipe 31' or pipe 32'.

The load handling mechanism 3 may consist of a single load carrying member for loads, but by preference such support consists of spaced, fixedly related parallel load carrying members 3a, 3a, which may engage with and raise a double faced pallet, indicated as an entirety at A, as shown in Figs. 14 and 15. Each member 3a consists of a pair of channels or side bars 3b on which a platform 3c is fixedly mounted. The outer side bar, at its inner end portion, is related face to face with and rigidly secured to the adjacent side 39 of a U-member 39a, whereas the inner side bar, at its inner end, is rigidly secured to the base portion of the U-member 39a. Each side 39 of the U-member 39a is rigidly connected to the base portion thereof by a base plate 40. The load carrying members 3a, U-member 39a and base plates 40 are movably supported for vertical movement as a unitary assembly by pairs of front and rear parallel levers or bell-cranks 41, 41a, each pair thereof being fulcrumed on a shaft 42, the opposite ends of which are mounted on the depending sections of the angles 2'. The inner end of each front bell-crank 41 is pivotally mounted on a standard 43 fixed to an angle 43x carried by the adjacent plate 40, whereas the inner end of each rear bell-crank 41a is pivotally mounted on a standard 43a fixed to the base portion of the U-member 39a. The outer ends of the bell-cranks 41, 41a, of each pair are connected together by a link 44 and the outer ends of the front bell-cranks 41, 41a, are pivotally connected to a cross-head 44a carried by the outer end of a piston rod 45. The inner end of the piston rod 45 is provided with a piston 45a reciprocatable in a cylinder 46, the outer end of which is pivotally mounted on a bracket 46a fixed to the wall 2a of the frame section 1a. The rear end of the cylinder 46 is provided with an inlet to which a fluid supply pipe 47 is connected, the opposite end of the pipe being connected through the collar 24a and shaft 23a to the valve mechanism 25 (as later set forth). The supply of fluid to the cylinder 46 serves to operate the piston 45a outwardly (toward the left as viewed in Figs. 1, 3 and 4), which movement swings the bell-cranks 41, 41a, about their fulcrums and raises the load carrying members 3a and through a linkage hereinafter referred to simultaneously swings the yoke (which carries the wheels 10) about its shaft, as later set forth, the effect of which is to raise the outer ends of the members 3a in co-operative relation with the movement of the bell-cranks 41, 41a (see Fig. 4), so as to maintain the members 3a horizontal during movement thereof as well as relieve undue strains on the frame 1 and bell-cranks 41, 41a. Movement of the piston 45a inwardly is effected by the gravitation of the members 3a by control of the valve mechanism 25, as later set forth, the linkage and bell-cranks co-operatively serving to maintain the members 3 horizontal during downward movement of the latter. Due to this co-ordinated movement of the bell-cranks 41, 41a, and wheels 10, danger of tipping the load or causing it to slide on the members 3a is avoided. To provide for the swinging movement of the wheels 10, the shaft 48 for each pair thereof is supported in the outer end of a yoke 48a. The yoke 48a is swingably mounted at its inner end on a shaft 49, the latter being supported at its opposite ends in the side bars 3b of the adjacent member 3a. The yoke 48a for each pair of wheels 10 preferably consists of side elements and an intermediate element 48a', to which the outer end of a pull rod 49a (which forms a part of the linkage already referred to) is pivotally connected. The inner bifurcated end of the pull rod 49a is movably supported on pads 49b carried by the adjacent plate 40 and pivotally connected through a link 50 to the outer end of an arm 51 fixed to and depending from the horizontal section of the adjacent angle 2' (see Fig. 5). When the members 3a are raised, as above set forth, the inner end of each rod 49a is moved upwardly relative to the arm 51, due to the engagement of its inner bifurcated end with the pads 49b, so that the link 50 between the arm 51 and rod 49a exerts a pull on the rod 49a and moves it endwise toward the left (as viewed in Figs. 1, 3 and 4) and operates to swing the yoke 48a to the position shown in Fig. 4. When the load handling mechanism 3 is in its lower or normal position, the yoke 48a is held in an inclined position (see Fig. 1) by the arm 51, link 50 and rod 49a, but when the latter is moved endwise as above set forth, and the yoke 48a is swung about its shaft 49, it re-acts between the ground and adjacent member 3a to raise the latter, as shown in Fig. 4. As this movement of the yoke 48a is effected by the movement of the inner end of the adjacent member 3a, the yoke serves to support and maintain the member 3a in horizontal position during this movement and when the member is held in elevated position. Due to the linkage connections between the yokes 48a and frame section 1a, it will be observed that in either position of the yokes, the wheels 19 co-operate with the wheel 9' to support the frame 1 and provide for translation of the latter from place to place. The inner bifurcated end of each rod 49a is preferably provided with rollers 49x for rolling on the pads 49b during endwise reciprocatable movement of the rod. As shown in Figs. 1 and 4, the shafts for the rollers 49x are extended and project through and traverse elongated slots formed in angles 49', which are fixed to the plates 40, the engagement of the shafts with the walls of the slots serving to connect the inner ends of the rods 49a to the plates 40 to insure movement thereof downwardly with the load handling mechanism 3 and endwise movement of the rods 49a to the right as viewed in Fig. 1 when the mechanism 3 is lowered. The outer end of the rod 49a is connected with the yoke element 48a' by a clevis 49x', the rod 49a being threaded into the end wall of the clevis, so that by rotating the rod 49a the effective length thereof between the yoke 48a and arm 51 may be adjusted to insure a predetermined swinging movement of the yoke 48a.

Due to the fact that the truck is guided or steered by the operator through the instrumentality of a manually operated element, indicated as an entirety at 52, the controls (later referred to) for the motor 15 and material handling mechanism 3 and the fluid supply tank 21, motor 6 and fluid circulating pump 22 are mounted on the rotatable disk 12, the fluid connection 47 to and from the cylinder 46 is preferably provided in the joint or bearing elements 23a, 24a. As shown in Fig. 8, the shaft 23a is formed with a duct 53 closed at its upper end by a plug 53a. At its lower end, below the bracket 24c, the duct 53 is provided with a lateral port 54 to which that section of the pipe 47, leading from the valve 25, is connected. The upper portion of the shaft 23a, intermediate the bearing 24 and shoulder 23b, is formed with an annular recess 55, which is connected by a plurality of ports 55a with the duct 53, whereas the collar 24a is formed with an opening 56, which is in line with the recess 55 and is connected to that section of the pipe 47 leading to the cylinder 46, whereby fluid flow between the valve 25 and cylinder 46 is provided for while permitting steering of the wheel 9'.

The valve mechanism 25 comprises the following: 25a indicates the valve housing, preferably bolted to the side wall of the tank 21 by screws 25a', and formed to provide a plunger bore 25b preferably extending therethrough from end to end. A tapped fluid pressure outlet and return port 25c to which the pipe 47 is connected, extends inwardly from one side of the housing 25a, intersecting the plunger bore 25b and completely surrounding the plunger 25d within the bore, whereas the opposite side of the housing 25a is formed with a pressure inlet passage and port 70, to which the pipe 29 is connected, surrounding the housing bore 25b for the purpose of introducing pressure hydraulic fluid to the control valve. The ports 25c and 70 are adjacent each other and positioned approximately midway of the length of the housing bore 25b, which bore terminates at its upper end in an enlarged discharge passage 71, which is connected through an opening 71a with the tank 21.

The chambered valve housing 25a includes at its lower end an enlarged passage or port 72 surrounding the valve bore 25b in communication with the tank 21. The upper end of the bore 25b, beyond which the plunger 25d never extends, is closed by a hollow screw cap 57 sealed by a gasket 57'. A coiled, centering or neutralizing spring 58 surrounds the valve plunger 25d within the discharge passage 71 and is secured at one end by a threaded plug and cap 60 tapped into the adjacent end of the hollow valve plunger. While the head of plug 60 fits loosely within the hollow screw cap 57, the inwardly extending end of the latter serves as a seat for the spring 58 in the "neutral" position illustrated in Fig. 13. The valve plunger 25d is formed to provide also a shouldered land portion 62 for receiving the neutralizing spring 58 and the valve housing 25a is shaped to form a countersunk seat for the inner end of the spring 58. Washers 65 may be used at the opposite ends of the spring 58 to provide continuous seating areas of good width for either pushing or, in cooperation with the cap 57 of housing 25a, holding the corresponding end of spring 58 as the plunger 25d is moved relative to its "neutral" position. In view of the possibility of leakage endwise of the hollow valve plunger, its threaded plug 60 is provided with a resilient seal ring 66 cooperating with the interior of the plunger.

The upper end of the hollow plunger 25d carries a check valve means, which preferably comprise a relatively light check valve spring 68 bearing at one end on the end of plug 60 and at the other upon a check member in the form of a ball 70' seating across the smaller intermediate passage portion 72' of the valve plunger 25d, and controlling the passage of hydraulic pressure fluid from an immediately adjacent side delivery port 74.

In like manner, the lower end of the hollow valve plunger 25d is tapped to receive the threaded end 76 of a lug 78 and is provided with a resilient sealing ring 80 acting between the interior of the valve plunger and the end 76. As later set forth the lug 78 is pivotally connected to a control element for operation by the operative. A relatively heavy relief valve spring 82 acts against the threaded end 76 and a relief valve member 84 preferably in the form of a ball for the sake of simplicity and economy. The ball member 84 seats over the adjacent end of a reduced port 86 of the plunger bore to close this end of the bore at a point slightly inward of side delivery ports 88.

Between the longitudinally spaced side delivery port 74 and side delivery ports 88, adjacent the respective check valve means, is an inlet and outlet side delivery port 90 controlled only by the passage or unported portions of the plunger bore 86.

It will be appreciated that the side delivery ports 74, 88, and 90 may be of any desired shape and may constitute outwardly opening slots in the valve plunger 25d, but preferably consist of circumferentially spaced series of moderate sized drilled openings of circular shape at each of these places.

The side delivery relief port or ports 88 lie within an extended groove part 92 of plunger 25d, the length of this groove part being sufficient to provide a by-pass between the hydraulic fluid-pressure inlet port 70 and the combination by-pass and relief port 72 when the plunger 25d is in its "neutral" position.

The operation of the control valve will now be explained with reference to Fig. 13. The spring 58, which has one of its ends in abutment with the valve housing 25a and the other with the cap 57, normally maintains the valve plunger 25d in the "neutral" position as illustrated. At this time, the unpassaged or unintersected portions of the valve bore 25b effectively block both the side delivery ports 74 and 90, and the ball member 84 of the relief valve means is not exposed to any hydraulic fluid pressure. Note is also made that the grooved portion 92 of the valve plunger 25d affords a good sized ring shaped by-pass opening from the pressure inlet passage 70 directly to the enlarged hydraulic fluid port 72 which is in open communication with the reservoir tank 21. In this neutral position of the valve plunger 25d a free fluid by-pass is provided from the pump 22 through valve 23, the pipe 29, port 70, the plunger groove 92 and out the combination by-pass and relief port 72.

By a downward movement of the valve plunger 25d the intermediate side delivery ports 90 communicate with the hydraulic fluid pressure supply port 70 and groove 92 is closed. Pressure hydraulic fluid thus introduced is blocked at one end by the relief valve ball 84 and constrained to flow through the valve plunger where it unseats the lightly spring-pressed check ball 70' and discharges into the hydraulic fluid outlet port 25c which has, at the same time, been placed in hydraulic fluid communication with the side delivery ports 74.

When the valve plunger 25d is moved upwardly beyond its "neutral" position, the side delivery ports 90 are moved into registry with the tapped opening 25c and the ports 74 are moved into communication with the passage 71. Again being blocked by the superior resistance of the relief valve ball member 84, the hydraulic fluid returned from the hydraulic cylinder 46 will unseat the check valve ball 70' and discharge through the side delivery ports 74 to the passage 71 whence the hydraulic fluid is returned to the tank 21 through the outlet 71a.

From the foregoing description it will be observed that when the valve plunger 25d is moved downwardly fluid is supplied from pipe 29 and flows through the plunger to pipe 47 and through the latter to the cylinder 46 to operate the material handling mechanism 3 upwardly and that when the valve plunger 25d is moved upwardly (beyond its "neutral" position) fluid return flow from the cylinder 46 is through the pipe 47 and valve plunger 25d to the passage 71 and through the outlet 71a to the tank 21, to permit lowering of the material handling mechanism 3. It will also be observed that when the material handling mechanism 3 is raised, it may be retained in such position merely by moving the valve plunger 25d to "neutral" position, thereby closing off return flow of the fluid through pipe 47 and effecting fluid flow from pipe 29 to passage 72 and back to the tank 21.

In the normal operation of the control valve 25 to supply fluid to the cylinder 46, the relief valve means will function only to block one end of the hollow control valve plunger 25d through the medium of the ball member 84. In such operation the relief valve means will function to relieve excessive hydraulic fluid pressure and return it to the reservoir tank 21, in the event that the material handling mechanism 3 should meet with unusual resistance or the then open part of the hydraulic fluid circuit should be pressure blocked in some other manner. Also, in the lowering of the material handling mechanism 3 the check valve means having the ball 70' and responsive to a lesser hydraulic fluid pressure, is effective in relieving pressure produced by return of hydraulic fluid from the hydraulic flow port 25c. It would, however, be possible for the relief valve means to function selectively during the downward movement of the material handling mechanism 3 should there be an abnormal surge of returned hydraulic fluid of such a pressure and volume that the check valve means could not handle all of the flow.

The arms 11a depend from a bracket fixed to the disk 12 and are provided with integral skirts 11b which are related to side skirts 11b' depending from a bracket 11b'' also fixed to the disk 12. The skirts 11b' terminate in a pair of spaced, parallelly related outwardly extending supports 11c. The guide or steering element 52 consists of a tubular member 93, a loop shaped member 93a at its lower end and a housing member 93b at its upper end. The side walls of the loop shaped member 93a are fulcrumed on and between the supports 11c (see Fig. 2), whereby the steering element 52 may be bodily swung forwardly into convenient position to be grasped by the operative for guiding and controlling the movement of the truck. The lower end of the member 93a is pivotally connected to the outer end of a rod 94; the inner end portion of the rod is slidable in a fitting 94a suitably mounted on a rock shaft which is supported in the skirts 11b'. A spring 94b coiled around the rod 94 and interposed between the fitting 94a and the knuckle at the outer end of the rod 94 normally tends to swing the element 52 upwardly and maintain it in vertical position as shown in Fig. 1. The construction of the steering element 52 provides for the mounting of the controlling devices 95, 95a, for the valve mechanism 23 and a controlling device 96 for the valve mechanism 25 at or adjacent its outer end, whereby the operation of the rotary motor 15 and material handling mechanism 3 may be effected by the operative independently of the position of the steering element, so that bodily movement thereof is not required to operate or stop the motor 15 and the mechanism 3. The controlling devices 95, 95a, consist of handles rotatably mounted in the side walls of the housing member 93b (preferably in axial relation) and extending laterally therefrom. The inner end of each handle is provided with an arm 93c, the outer end of which is pivotally connected to the upper end of a rod 97. The lower end of the rod 97, which is connected to the handle 95a, is pivotally connected to the outer end of a bell-crank 97a, which is mounted on the adjacent skirt 11b', and the bell-crank 97a is pivotally connected to the outer end of a link 97b which in turn is connected to the valve element 33. Accordingly, by rotation of the handle 95a counter-clockwise, the valve element 33 is operated toward the left (as viewed in Fig. 11) to supply fluid to the motor 15, as already set forth. The lower end of the rod 97, which is connected to the handle 95, is pivotally connected to the outer end of a bell-crank 97a', mounted on the adjacent skirt 11b', the inner end of the bell-crank being pivotally connected to a link 97b', which in turn is connected to the valve element 33'; accordingly, by rotation of the handle 95 counter-clockwise the valve element 33' is operated toward the left (as viewed in Fig. 11) to supply fluid to the motor 15, as already set forth.

As shown in Fig. 11, each link 97b, 97b', is pivotally connected to a thrust element 97x' threaded in the outer end portion of the adjacent valve element and locked by a nut 97x", whereby the operating connections between each handle 95, 95a, and the adjacent valve element may be adjusted to insure accurate operation of the latter.

The controlling element 96 consists of a handle pivotally mounted on a bracket 96a carried by the steering element 52 and provided with an arm 96b pivotally connected to the upper end of a rod 97c. The lower end of the rod 97c is pivotally connected to the outer end of a bell-crank 98 (the axis of the pivot for the lower end of the rod 97c being in line with the axis on which the element 52 swings) fulcrumed on a stud shaft carried by the adjacent skirt 11b'. The inner end 98a of the bell-crank 98 is pivotally connected to the outer end of a link 97c' which is pivotally connected to the valve element or plunger 25d for the valve mechanism 25 for controlling the latter.

To permit the load carrying members 3a, 3a, to be projected within a double faced pallet A, as shown in Figs. 14 and 15, I provide in each member a roller 10a (preferably two rollers 10a in endwise relation) inwardly of the yoke 48a and a pair of rollers 10b, 10b', outwardly of the wheels 10 and disposed side by side. Each roller 10a loosely rotates on a shaft 10a'. The opposite ends of the shaft 10a' are supported in plates 10c which are fixed to a pair of transverse tie elements 10c' suitably secured to the inner and outer side members of the adjacent load carrying member 3a. The rollers 10b, 10b', loosely rotate on shafts 10d supported in a pair of longitudinally disposed plates 10e, which are secured at their inner ends to a transverse tie member 10e' supported between the adjacent side bars 3b and secured at their outer ends to the end wall 3b' for the side bars 3b. It will be observed that the rollers 10a are supported above the ground or surface, when the load handling mechanism 3 is in its lower or normal position (see Fig. 1) and the shafts 10d are mounted on the members 3a in a plane above that of the shafts 10a' for the rollers 10a and that the diameter of the roller 10b' is less than that of the roller 10b. In this arrangement, in moving the truck to project the load carrying members 3a into the pallet A in load raising position, the outer roller 10b' is capable of riding the outer or leading edge of the lower cross member a of the pallet A and to slightly raise the members 3a so that the rollers 10b and 10a can ride this cross member and roll on the inner cross members a' until the far end of the pallet A is reached, as shown in Fig. 14, thereby positioning the wheels 10 above the opening between the cross members a' and a" of the pallet. When the members 3a have been positioned as shown, the load handling mechanism 3 is operated by supplying fluid to the cylinder 46, such operation serving to endwise move the rods 49a and effect a downward swinging movement of the yokes 48a. In the initial movement of the yokes 48a the wheels 10 engage the ground or surface, which then operates as an abutment, so that this swinging movement of the inner end of the yokes serves to raise the load carrying members 3a and any load thereon as shown in Fig. 15. By holding the mechanism 3 in elevated position, by control of the valve mechanism 25 (as already set forth), the truck may be driven to the location of delivery and then the mechanism 3 is lowered to engage the pallet A with the ground or surface, following which the truck may be driven to remove the members 3a from the pallet A.

99 indicates a casing or housing extending around the parts mounted on the disk 12. 99a, 99a', indicate hoods fitting over the casing 99 and battery housing 5x, the hoods being hinged together.

From the foregoing description it will be observed that the pressure fluid system provides for the circulation of the fluid by continuous operation of the electric motor 6 to drive the pump 22 and return thereof to the tank 21 during the periods when the truck is not being driven or the load handling mechanism 3 is in either lowered or elevated position. This operation may be carried out by providing a suitable switch to close the motor circuit through a contactor 100. I prefer however to maintain the electric motor 6 at rest during these periods and to automatically close the circuit to the motor 6 and drive it each time either valve mechanism 23 or 25 is operated. In this preferred arrangement I provide a switch 101 adjacent to each valve plunger 33, 33', (see Fig. 1—these switches for valve plungers 33, 33', shown diagrammatically in Fig. 16), so that when either thereof is operated to supply fluid pressure to the motor 15, the adjacent circuit 102 will operate the contactor 100 to close the motor circuit 103 for the motor 5. Each switch 101 consists of suitable contacts in a housing and a resilient switch arm 101' normally disengaged from the contacts, the outer end portion of the arm being disposed in the path of movement of a collar 104 fixed to the adjacent valve plunger 33 by the nut 97x", so that operation of the plunger will swing the arm 101' inwardly and close the circuit 102. The corresponding switch, indicated at 105 (see Fig. 12), for the valve plunger 25d of valve mechanism 25, is provided with a resilient contact closing arm 106, having on its outer end a roller 106a, arranged to be operated by a cam 107 fixed to the valve plunger 25d when the latter is moved downwardly, such operation serving to close the circuit 108 and operate the contactor 100. In the arrangements above described, economical use of the current supplied by the battery 5 results, since the electric motor 6 is driven only when fluid pressure is required and since the fluid system remains at all times filled with fluid, no delay occurs in operating the motor 15 or load handling mechanism 3 upon operation of the valve mechanisms which control the fluid supply therefor.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. A truck comprising a traction and steerable unit consisting of front and rear frame sections, an elevating load carrier unit the inner end portion of which extends inwardly into overlapping relation to said rear frame section, a support rotatably mounted on said front frame section, a traction wheel mounted on said support, means for driving said wheel, spaced depending supports on said rear frame section, inner and outer cross shafts mounted on said depending supports, front and rear pairs of bell-cranks fulcrumed on said shafts, corresponding arms of said bell-cranks being pivotally connected to the inner end portion of said carrier unit, a horizontally disposed cylinder mounted in said rear frame section, a piston in said cylinder, a piston rod connected to said piston, operating connections between said rod and the other corresponding arms of said bell-cranks, a hydraulic supply system having valve controlled connections to one end of said cylinder, and a device connected to the said wheel support for rotating it to steer said wheel.

2. A truck comprising a traction and steerable unit and a load carrier unit, said first mentioned unit consisting of front and rear frame sections, said front frame section having a horizontal wall formed with an opening, a disk rotatably mounted in said opening and a traction mechanism mounted on the lower side of said disk and consisting of a wheel and a mechanism for driving said wheel, a pair of wheels below the outer end portion of said carrier unit and co-operating with said traction wheel to support said units, the inner end portion of said carrier unit extending inwardly into overlapping relation to the rear section of said first mentioned unit, spaced parallel operating levers between and connected to said inner end portion of the carrier unit and the rear frame section of said first mentioned unit for connecting said units together and for raising said carrier unit vertically, a hydraulic systtem including piston-cylinder elements connected thereto, said piston-cylinder elements being disposed horizontally between said spaced levers and mounted on the rear frame section of said first mentioned unit and operatively connected to said levers, and an element connected to said disk for rotating it to steer said truck during translation thereof.

3. A truck comprising a traction and steerable unit and a load carrier unit, said first mentioned unit consisting of front and rear frame sections, said front frame section having a horizontal wall formed with an opening, a disk rotatably mounted in said opening and a traction mechanism mounted on the lower side of said disk and consisting of a wheel and mechanism for driving said wheel, a pair of wheels below the outer end portion of said carrier unit and co-operating with said traction wheel to support said units, the inner end portion of said carrier unit extending inwardly into overlapping relation to the rear section of said first mentioned unit, spaced supports depending from said rear frame section, spaced pairs of parallel operating levers mounted on said supports, corresponding ends of said levers being connected to said inner end portion of the carrier unit for connecting the latter and said rear frame section of said first mentioned unit together and for raising said carrier unit vertically, a hydraulic system including piston-cylinder elements connected thereto, said piston-cylinder elements being disposed horizontally between said spaced pairs of levers and mounted on the rear frame section of said first mentioned unit and operatively connected to the opposite corresponding ends of said levers, and an element connected to said disk for rotating it to steer said truck during translation thereof.

FRANK STONER.

REFERENCES CITED

The following references are of record in the file of this patent:

UNITED STATES PATENTS

| Number | Name | Date |
|---|---|---|
| 2,274,164 | Quayle | Feb. 24, 1942 |
| 2,320,600 | Howell | June 1, 1943 |
| 2,325,396 | Hastings | July 27, 1943 |
| 2,359,493 | Schreck | Oct. 3, 1944 |
| 2,417,018 | Schroeder | Mar. 4, 1947 |
| 2,417,395 | Framhein | Mar. 11, 1947 |